3,153,019
POLYMERIZATION OF DIKETENES
Hellmuth Spes and Theodor Altenschöpfer, Burghausen, Upper Bavaria, Germany, assignors to Wacker-Chemie G.m.b.H., Munich, Germany
No Drawing. Filed Dec. 13, 1960, Ser. No. 75,481
Claims priority, application Germany Dec. 22, 1959
1 Claim. (Cl. 260—78.3)

The present invention relates to an improved process for the polymerization of diketene.

The polymerization of diketene in the presence of alkaline catalyst is known. In addition, the formation of more or less large quantities of a dark brown resinous worthless residue, the dimer of diketene, that is, dehydracetic acid, is formed as the only definite polymerization product. The reaction is carried out in solvents inert with respect to the diketene or in the absence of a solvent.

According to the invention it was found that new white highly polymeric products of diketene can be produced by mixing a diketene free of polymers and residues with a hydroxyl group containing organic solvent and polymerizing the diketene in the mixture in the presence of alkaline catalysts and at temperatures between 0° C. and 60° C., the suspension of the polymers only being held at reaction temperatures until the ketene has been converted and the polymer being filtered off from the suspension after cooling below reaction temperature.

It is essential for the success of the process according to the invention that the starting diketene used is a distilled and residueless diketene and that the reaction product is cooled down and filtered off directly after conversion of the diketene. A suitable diketene starting material, which usually still contains about 2-3% of acetic acid anhydride, can be obtained by distillation of a crude 85-90% diketene obtained in the polymerization of ketene which in addition to acetic acid anhydride also contains 5-10% of a dark brown resinous residue. This crude diketene which can be used with equal success as the distilled diketene for the production of acetoacetic acid ester from diketene is itself, however, not polymerizable.

The reaction proceeds at a relatively low temperature and is terminated as soon as the development of heat of reaction subsides. The termination can be effected by cooling and/or neutralization of the catalyst. By appropriate selection of the reaction conditions, such as temperature, catalyst concentration, reaction time, proportion of alcohol to diketene, all of which depend upon each other, it is possible to repress the formation of acetoacetic acid so far that highly polymeric diketene is the main reaction product. A subsequent reaction at higher temperature or a heating of the reaction mixture at the end of the reaction is to be avoided in any event.

The fact that the polymerization cannot be carried out when crude diketene is used is evidence that the production of new polymeric diketene is only rendered possible by use, according to the invention, of the two essential measures, namely, the use of a residueless diketene and immediate mechanical removal of the polymer from the reaction solution.

The process according to the invention is completely surprising and unexpected as it is known that acetoacetic acid ester can be produced by the action of alcohol on diketene in the presence of alkaline or acid catalysts at temperatures between 19° C. and the boiling point of the alcohol used. The production of a polymeric diketene in such processes has never been described.

The process according to the invention, for example, can be carried out by stirring the diketene with the alcohol and catalyst in a reaction vessel until the diketene has been converted. It is also possible to add the diketene gradually to the alcohol containing the catalyst dissolved therein or to operate continuously in a recycling apparatus. The resulting suspension of the polymeric diketene is then immediately filtered off, centrifuged off or separated off in a similar mechanical manner and freed of organic solvent by suspending in water. Every hydroxyl group containing organic solvent which is liquid at the reaction temperature is suited for the reaction. For example, all aliphatic and alicyclic primary, secondary and tertiary alcohols, as well as phenols, can be used for the reaction medium. Such compounds can be monohydroxy or polyhydroxy compounds and may also contain other functional groups in addition to the OH group or groups. Specific examples of usable hydroxyl group containing compounds, for instance, are methanol, ethanol, propanol, butanol, isopropanol, glycol, glycerol, cyclohexanol, phenol and glycolic acid butyl ester.

Metal hydroxides and alcoholates, salts of weak acids which dissolve in water with an alkaline reaction, as well as nitrogen bases, come into consideration as catalysts. The concentration of the catalyst in the reaction mixture can vary within wide limits and is to a great extent dependent upon the size of the reaction mixture as well as the effectiveness of the cooling. Preferably, only so much catalyst is employed that the reaction does not proceed stormily and that the reaction temperature may easily be maintained by cooling at the desired temperature. In general, 0.1-10% by weight of catalyst based upon the quantity of diketene supplied have been found suitable.

The reaction temperature employed is below that normally employed in the production of acetoacetic acid ester, namely, the boiling temperature of the particular alcohol employed. The reaction temperature and duration of the reaction period are very dependent upon each other. When relatively high reaction temperatures are employed, for example, about 60° C., the polymerization is completed after only a few minutes. Preferably, however, a temperature of about 40° C. is employed as at this temperature the tendency for forming acetoacetic acid ester is still not too great but, on the other hand, the polymer is produced in a form which is easily filtered. However, it is also possible to operate at temperatures around 0° C. In this instance the reaction mixture assumes a salve like consistency.

The proportion of alcohol to diketene can be varied within wide limits. However, to avoid the formation of dehydracetic acid, which at the same time leads to yellow coloration of the reaction product, it is expedient to use a molar ratio of $\geq 1$.

The diketene polymer produced is a pure white odorless substance which, depending upon the conditions of its production, melts between 70 and 90° C. It can be used in the synthetic resin industry. It is believed that the substance is a polyester type compound of the following formula

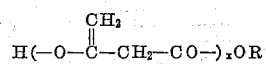

whose chain end is satisfied by the alcohol ROH used as the solvent. The polymeric diketene in a number of reactions behaves just like diketene. It can, for example, react with alcohols to form acetoacetic acid esters. Similarly, it can react with water, amines and the like to form the corresponding derivatives. It is of particular note that the polymeric diketene can be handled completely without danger and that it is odorless and does not irritate the sensory organs and therefore provides an advantageous substitute for the dangerous diketene which could not be shipped in larger quantities.

The following examples will serve to illustrate several embodiments of the invention.

Example 1

The mixtures of alcohol, distilled diketene and catalysts given in the following table were raised to and maintained as a by-product can be processed for the recovery of such acetoacetic acid ester. In view of the lack of other by-products such as a resinous residue and dehydracetic acid the total yields of polymeric diketene and acetoacetic acid ester are about 95–99% with reference to the diketene.

| Reaction medium | Diketene, 97.9%; remainder acetic acid anhyd., g. | G. | Catalyst | G. | React. temp., °C. | Reaction period, hours | Color react. prod. | Color of Polymer | Percent yield | |
|---|---|---|---|---|---|---|---|---|---|---|
| | | | | | | | | | Polym. diketene | Acetoacetic acid ester corr. to alcohol |
| Ethanol | 138 | 42 | Na-acetate | 0.4 | 40 | 4:00 | Yellowish | White | 50.0 | 49.4 |
| Do | 138 | 42 | do | 2.0 | 50 | 0:40 | do | do | 66.2 | 31.5 |
| Do | 138 | 42 | KOH | 0.2 | 40 | 3:00 | do | do | 45.3 | 52.6 |
| Do | 138 | 42 | Pyridine | 0.4 | 40 | 24:00 | do | do | 30.0 | 68.0 |
| Do | 138 | 42 | Sodium dehydracetate | 0.4 | 40 | 7:00 | do | do | 42.8 | 55.8 |
| 2-ethylhexanol | 138 | 42 | Sodium acetoacetate | 0.8 | 40 | 3:30 | do | do | 42.2 | 55.8 |
| Methanol | 32 | 84 | Na-acetate | 0.4 | 0 | 17:20 | do | do | 22.0 | 76.7 |
| Do | 96 | 42 | do | 0.4 | 0 | 21:50 | do | do | 26.0 | 72.0 |
| Do | 96 | 42 | do | 0.4 | 40 | 3:45 | do | do | 39.2 | 59.4 |
| Do | 96 | 42 | do | 0.4 | 60 | 1:15 | do | do | 35.1 | 62.8 |
| Do | 96 | 42 | do | 0.8 | 40 | 1:20 | Yellow tinged | do | 40.0 | 58.6 |
| Do | 96 | 42 | do | 4.0 | 40 | 1:10 | do | do | 45.7 | 52.3 |
| Do | 96 | 42 | Na-methylate | 0.3 | 40 | 1:00 | Yellowish | do | 27.0 | 70.6 |
| Isopropanol | 180 | 42 | K-acetate | 0.4 | 40 | 2:10 | Yellow | Yellow | 44.0 | 54.4 |
| Butanol | 178 | 42 | Mg(OH)$_2$ | 0.4 | 40 | 2:05 | Yellowish | White | 42.1 | 56.8 |
| Glycol | 186 | 42 | Ca(OH)$_2$ | 0.4 | 40 | 4:00 | Yellow tinged | do | 46.0 | 62.1 |
| Glycerine | 138 | 42 | Soda | 0.4 | 60 | 5:00 | Yellowish | do | 30.1 | 68.3 |
| Glycolic acid butylester | 138 | 42 | Na-acetate | 0.4 | 40 | 6:00 | Yellow tinged | do | 30.0 | 69.0 |
| Phenol | 94 | 84 | do | 0.4 | 40 | 5:00 | do | do | 28.5 | 65.4 |
| Cyclohexanol | 138 | 42 | do | 0.4 | 40 | 2:00 | Yellowish | do | 58.2 | 39.7 | at the reaction temperature indicated while stirring until the odor of diketene vanished, the resulted suspension was cooled, the catalyst neutralized with sulfuric acid if necessary, the polymer filtered off with suction, suspended several times in water, decanted, then filtered, dried and weighed.

For $(C_4H_4O_2)_x$:
Calculated—
C=57.14%
H=4.80%
O=38.06%
Found—
C=57.02%
H=4.93%
O=38.06%

The yellowish tinged to yellow filtrates composed of the solvent and the corresponding acetoacetic acid ester

Example 2

As a comparison with Example 1, the polymerization of diketone was carried out in various non-hydroxyl group containing organic solvents. Mixtures of diketone (of the same quality as used in Example 1), the catalyst and an organic solvent inert with respect to the diketone were stirred and reacted at the temperature indicated in the following table until the diketone odor disappeared. The crystals which separated—if necessary after concentration of the reaction solution—were filtered off, recrystallized from butanol or dioxane and identified by the melting point or respectively the mixed melting point with dehydracetic acid and 2,6-bis-(6-methyl-4-oxo-2-pyranylmethyl)-pyrone. Polymeric diketone was not found in any instance. The following table gives the results produced.

| Solvent | React. temp., °C. | React. period, hours | Catalyst | Color of reaction mixture | Reaction product |
|---|---|---|---|---|---|
| Acetoacetic acid ethyl ester | 40 | 24:00 | Na-acetoacetic ester | Red brown | Dehydracetic acid and pyrone. |
| Dioxane | 40 | 3:00 | Na-acetate | do | Dehydracetic acid. |
| Acetone | 40 | 3:00 | do | do | Pyrone. |
| Dimethylsulfoxide | 40 | 3:00 | do | do | Dehydracetic acid. |
| Acetic acid | 40 | (¹) | KOH | Light yellow | |
| Chloroformic acid ester | 40 | (²) | Na-acetate | Brown | |
| Dimethylformamide | 40 | 1:20 | do | Red brown | Do. |
| Methoxypropionic acid methyl ester | 40 | 3:20 | Na-methylate | do | Do. |
| α-Methylpropiolactone | 40 | 3:25 | Na-acetate | Orange | Pyrone. |
| Tetrahydrofurane | 40 | 5:10 | do | Red brown | Dehydracetic acid. |
| Diethylether | 0 | 48:00 | K-acetate | Brown | Do. |
| Diethyleneglycoldiacetate | 0 | 50:00 | Na-acetate | Red brown | Do. |
| Carbon tetrachloride | 0 | 96:00 | do | do | Do. |
| Perchloroethylene | 0 | 72:00 | do | do | Do. |
| Ligroin | 0 | 72:00 | do | do | Do. |
| Shell oil 0901 | 0 | 72:00 | Soda | do | Do. |
| Benzol | 0 | 72:00 | Pyridine | do | Do. |
| Dichlorethylene | 0 | 72:00 | Soda | do | Do. |
| Butyric acid anhydride | 0 | 72:00 | Na-acetate | do | Do. |
| Ethylidenediacetate | 0 | 72:00 | do | do | Do. |
| Isopropenylacetate | 0 | 72:00 | do | do | Do. |
| Acetic acid anhydride | 0 | 72:00 | Sodium dehydracetate | do | Do. |

¹ After 17 hrs. only 8.5% conversion.
² No reaction heat.

Example 3

As a further comparison with Example 1, 48.5 g. of crude diketone containing 87% of diketone, 10.5% of a dark brown polymeric residue and 2.5% acetic acid anhydride were reacted as described in Example 1 in 50 g. of methanol in the presence of 0.4 g. of sodium acetate at 0–20° C. The reaction product was liquid and polymeric diketone was not formed. The yield of acetoacetic acid methyl ester was 53 g. corresponding to 91% of the theoretical.

We claim:

A process for the polymerization of diketone which comprises mixing distilled diketone free of residues with a hydroxyl group containing organic solvent selected from the group consisting of lower alkanols, glycol, glycerol, cyclohexanol, phenol and glycolic acid butyl ester and polymerizing the diketone in such mixture while cooling in contact with 0.1 to 10% of an alkaline catalyst based upon the diketone supplied at a temperature between about 0° C. and 60° C., the molar ratio of diketone to hydroxyl group containing solvent being 1:at least 1 and directly after completion of the reaction of the diketone cooling the reaction mixture below the reaction temperature and separating the suspended polymer therefrom mechanically.

References Cited in the file of this patent

UNITED STATES PATENTS 2,229,204    Boese  ------------------ Jan. 21, 1941
2,585,537    Coffman  --------------- Feb. 12, 1952

OTHER REFERENCES

Furukawa et al.: Die Macromolekaie Chemie 39, pages 242–245 (1960).

Rall et al.: Chem. Abstracts, volume 47, page 11155 (1953).

UNITED STATES PATENT OFFICE
CERTIFICATE OF CORRECTION

Patent No. 3,153,019                                  October 13, 1964

Hellmuth Spes et al.

It is hereby certified that error appears in the above numbered patent requiring correction and that the said Letters Patent should read as corrected below.

Column 4, lines 38, 39, 41, 43 and 49, column 5, lines 4, 9, 13 and 18 and column 6, lines 2, 3 and 5, for "diketone", each occurrence, read -- diketene --.

Signed and sealed this 20th day of April 1965.

(SEAL)
Attest:

ERNEST W. SWIDER
Attesting Officer

EDWARD J. BRENNER
Commissioner of Patents